United States Patent [19]

Crotti et al.

[11] Patent Number: 4,703,332

[45] Date of Patent: Oct. 27, 1987

[54] INK JET PRINT HEAD AND PRINTER

[75] Inventors: Alessandro Crotti, Strambino; Roberto R. Luc, Ivrea, both of Italy

[73] Assignee: Ing. C. Olivetti & C., S.p.A., Ivrea, Italy

[21] Appl. No.: 927,227

[22] Filed: Nov. 5, 1986

[30] Foreign Application Priority Data

Nov. 14, 1985 [IT] Italy .............................. 67962 A/85

[51] Int. Cl.[4] .............................................. G01D 15/16

[52] U.S. Cl. ................................. 346/140 R; 400/126

[58] Field of Search .......................... 346/140; 400/126

[56] References Cited

U.S. PATENT DOCUMENTS

| | | | |
|---|---|---|---|
| 4,503,442 | 3/1985 | Barbaro | 346/140 |
| 4,503,443 | 3/1985 | Dagna | 346/140 |
| 4,628,334 | 12/1986 | Dagna | 346/140 |
| 4,630,077 | 12/1986 | Berruti | 346/140 |

*Primary Examiner*—Joseph W. Hartary

*Attorney, Agent, or Firm*—Banner, Birch, McKie & Beckett

[57] ABSTRACT

The head is formed by a container (2) comprising a rigid frame (14, 16) of tapered shape, bearing the nozzle (4) at one end thereof. Fitted into the frame is a tubular membrane (47) for containing the ink, which is sealed at the other end of the frame by a metal plate (51) connected to an electrode (6) in contact with the ink. The frame is provided with openings (58) to permit the membrane to keep the ink at atmospheric pressure. The electrode (6) is formed by a blade spring in contact with the metal plate (51) and is provided with a projection (42) disposed in a chamber (30) in the vicinity of the nozzle to maintain contact with the ink right up to exhaustion of the cartridge. The head is removably fixed in a seat on a carriage by means of lever which urges the head into its seat and also serves as electrical contact with the metal plate. A second contact is made to an electrode on the front of an alumina plate (3) in which the nozzle (4) is formed.

13 Claims, 10 Drawing Figures

INK JET PRINT HEAD AND PRINTER

BACKGROUND OF THE INVENTION

The present invention relates to an ink jet print head and to a printer incorporating such a head.

In a known head of the above-indicated type, it has been proposed that a rigid containter should be partially filled with ink and that the head should include a chamber for venting vapour bubbles and for compensating for the pressure in the ink.

The known head comprises a metal element which is disposed at the end of the container which is opposite to the nozzle and which is in electrical contact with a conducting element which extends into the vicinity of the nozzle. The known head gives rise to difficulties in regard to filling it with ink and it requires a drill in order to bring it into use. In addition, because of the drilling operation, it cannot be temporarily removed to be subsequently re-used.

In order to overcome these disadvantages, a head has been proposed, comprising a rigid frame formed by two shell members and a flexible membrane disposed in such a way as to form a closed chamber with one of the shell members to contain the ink and together with the other shell member to form an air chamber communicating with the atmosphere. That head also gives rise to difficulties in regard to filling it, since it requires the membrane to be perforated while the sealing connection between the two shell members and the membrane is fairly complicated.

SUMMARY OF THE INVENTION

The object of the present invention is to provide a print head which is mounted removably on the printer, which permits easy filling with ink and whose efficiency in the printing operation remains unaffected until the ink is exhausted.

To this end the invention provides an ink jet print head for electrically conductive ink comprising a container for the ink, having a nozzle for the on-demand emission of droplets of ink, an electrode in contact with the ink and a counter-electrode adjacent to the nozzle, the emission being caused by an electrical voltage pulse between the counter-electrode and the electrode such as to cause vaporisation of the ink in a portion of the nozzle, characterised in that the container comprises a rigid frame of insulating material of tapered shape, the nozzle being disposed at one end thereof, a tubular membrane fitted into the frame to contain the ink and having an edge connected sealingly to the frame in the vicinity of said nozzle, and a second edge connected to the opposite end of the frame and locked thereto by a metal plate connected to the electrode, the frame being provided on two opposite side surfaces with at least two corresponding openings to permit the membrane to keep the ink at atmospheric pressure during the printing operation.

DESCRIPTION OF THE PREFERRED EMBODIMENTS

Figure 1:
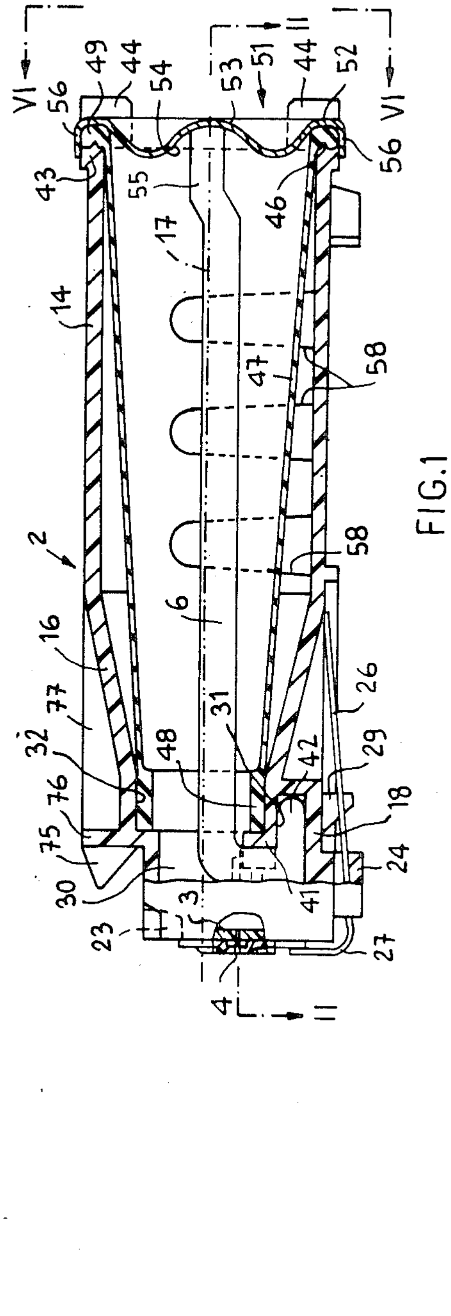
FIG. 1 is a view in longitudinal section of a print head according to the invention.

Referring to FIG. 1, an on-demand ink jet print head 1 is adapted to be mounted removably in a suitable seat on a printer, as will be seen in greater detail hereinafter. The head 1 essentially comprises a container or cartridge for the ink, generally indicated at reference numeral 2 (see FIGS. 1 and 2), carrying an alumina plate 3 (see FIG. 3) in which a nozzle 4 is provided for emission of the drops of ink. The ink is of electrically conductive type and is in contact with an electrode 6 which is internal to the cartridge, as will be seen in greater detail hereinafter. Disposed on the outside surface of the plate 3 is another electrode 7 which is adjacent to the nozzle 4. The two electrodes 6 and 7 are electrically connected to a control circuit 8 known per se (see FIG. 7).

When the two electrodes 6 and 7 are excited with an electrical pulse generated by the circuit 8, an electrical current is created in the ink, and the density thereof in a section of the nozzle 4 (see FIG. 3) causes vaporisation of part of the ink. That varporisation effect causes a droplet of ink to be emitted towards the outside of the nozzle 4, for example in the manner described in our published European patent application No. EP0070110.

The plate 3 is substantially of the type described in our published European patent application No. EP0128679 in which the nozzle 4 is produced by perforating the plate 3 together with the electrode 7 in such a way as to provide a nozzle 4 which is slightly flared towards the outside.

Figure 5:
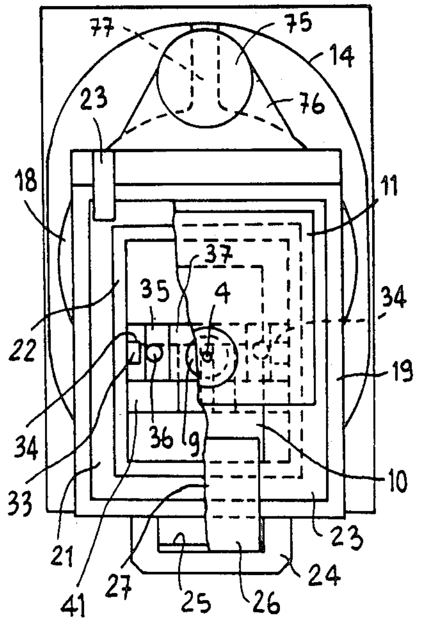
FIG. 5 is a partly sectional view along line V—V in FIG. 3.

The electrode 7 is formed by a layer 9 of noble metal, for example platinum, of circular shape, of a diameter which is between 1.5 and 2 mm, being concentric with respect to the position of the nozzle 4 (see FIG. 5). The layer 9 is covered by a layer 10 (see FIG. 3) of less noble metal, for example silver-palladium, covering the layer 9 and a rectangular area of the plate 3. The upper part of the plate 3 is finally covered by a layer 11 of wear-resistant glass which leaves free both the region of the layer 10 corresponding to the layer of noble metal 9 and a lower region of the layer 11 in which contact with the outside electrode is to occur, as will be seen in greater detail hereinafter.

Figure 6:
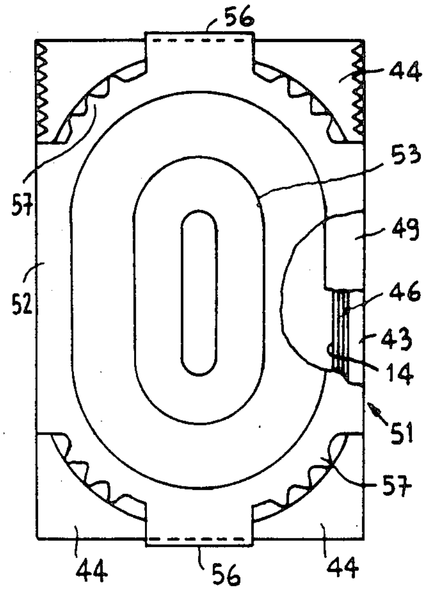
FIG. 6 is a view in section taken along line VI—VI in FIG. 1, but on an enlarged scale.

The cartridge 2 (see FIGS. 1 and 2) essentially comprises a frame of electrically insulating plastics material, for example glass reinforced polycarbonate. The frame is of a tapered configuration comprising a substantially cylindrical rear body portion 14 of a vertically elongated section as shown in FIGS. 5 and 6, and a front body portion 16 (see FIG. 1) which is substantially conical, with the smaller base circular. The body portions 14 and 16 have a common axis as indicated at 17.

The body portion 16 is connected at its front to a front portion 18 to which the plate 3 is fixed. The portion 18 terminates at the front with a rim portion 19 (see FIG. 5) of rectangular shape, whose width is substantially equal to that of the section of the cylindrical body portion 14. The rim portion 19 is provided with a peripheral groove 21 and an internal edge 22 (see FIG. 3) against which the plate 3 bears. The rim portion 19 is disposed in such a way that the central point thereof, at which the nozzle 4 of the plate 3 is disposed, is offset downwardly with respect to the axis 17 (see FIG. 1).

A portion of the top side of the groove 21 (see FIGS. 3 and 5) communicates with the outside lateral surface of the front portion 18 by way of a connecting groove 23. The groove 21 is covered by the plate 3 which is fixed to the rim portion 19 by filling the groove 21 with a suitable adhesive, by way of the connecting groove 23, after having caused the plate 3 to adhere to the edge 22 of the portion 18.

The front portion 18 of the cartridge 2 is provided in its lower part with a projection 24 having a longitudinal aperture 25 into which is fitted a metal blade spring 26 having a bent-over limb portion 27, which forms the outside electrode which is in contact with the metal layer 10. The blade spring 26 is also provided with a slot 28 which can be engaged over a tooth portion 29 projecting downwardly from the front portion 18. The limb portion 27 is then slightly forced in such a way as to ensure contact with the layer 10 of the plate 3.

Behind the plate 3, the front portion 18 forms a chamber 30 which extends downwardly into a region 31 adjacent to the lower edge of the plate 3, to form a small ink reservoir for maintaining the efficiency of the head 1 until the ink is totally exhausted. The chamber 30 is connected to the conical body portion 16 (FIGS. 1 and 2) by way of a cylindrical surface 32 which is coaxial with the axis 17.

Figure 3:
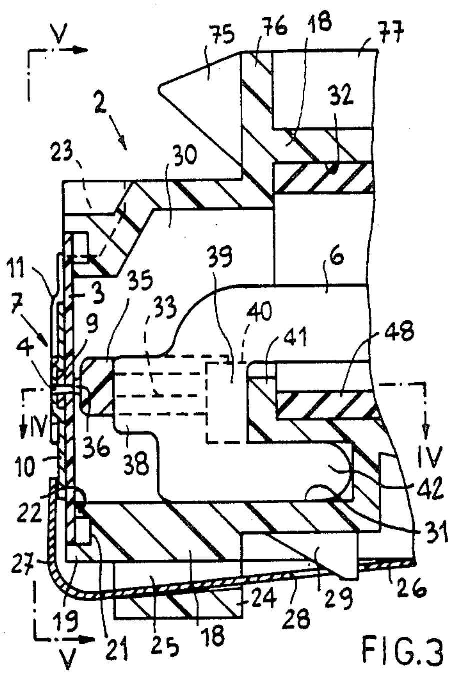
FIG. 3 is a view in longitudinal section on an enlarged scale of a detail from FIG. 1.
Figure 4:
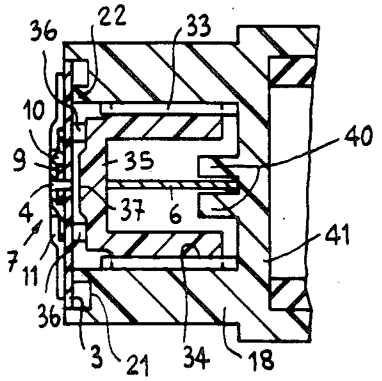
FIG. 4 is a view in section taken along line IV—IV in FIG. 3.

Disposed on each of the two sides of the chamber 30 is a rib 33 (see FIGS. 3 and 4) forming a longitudinal guide. Two grooves 34 in a block member 35 are fitted on to the two grooves 33. The block member 35 is provided with two projections 36 which are arranged to bear against the rearward surface of the plate 3 and a surface 37 for the reflection of the ink emission pressure wave.

The lengths of the projections 36 are such as to hold the surface 37 at a spacing from the plate 3 which is substantially equal to the thickness of the plate 3, for example a spacing of between 0.3 and 0.5 mm. The pressure wave reflection function which is performed by the surface 37 is described in our published European patent application No. EP0147186 so that it is not repeated herein. In addition the shape of the projections 36 is such as to permit access for the ink by capillary action from the chamber 30, 31 to the nozzle 4.

The electrode 6 is formed by a blade of resilient metal material having a projection 38 which is supported against the block 35, and a portion 39 which is fitted between two vertical ribs 40 (see FIG. 4) disposed in the chamber 30 on a shoulder 41 on the front portion 18. The blade 6 is provided with a projection 42 which extends into the region 31 of the chamber 30, to remain in contact with the ink even when the ink is close to being exhausted.

The cylindrical body portion 14 (see FIGS. 1 and 2) terminates at its rearward end with a rim portion 43 having a rib 46 of triangular section. The rim portion 43 is of rectangular outside configuration, of a width substantially equal to that of the cylindrical body portion 14 and thus the rim portion 19, whereby the cartridge 2 can be easily stacked or disposed in sideby-side relationship, with other cartirdges. The rim portion 43 is provided at the four corners with four prismatic projections 44 (see FIG. 6) of substantially triangular cross-section, which extend rearwardly with respect to the rim portion 43.

Fitted into the cylindrical body portion 14 is a tubular membrane 47 (see FIGS. 1 and 2) of flexible and elastic material, for example butyl rubber. The membrane 47 has a front edge 48 of a thickness which is larger than that of the body portion of the membrane and whose circumference is equal to that of the section of the cylindrical surface 32. The front edge is thus sealingly fitted against the cylindrical surface 32.

The membrane 47 further has a rearward edge 49 which is likewise larger in thickness than the body portion of the membrane 47. The inside surface of the membrane 47 and the edge 49 provide a development dimension equal to that of the inside surface of the cylindrical body portion 14. The edge 49 bears against the rib 49 and the rearward surface of the rim portion 43. The membrane 47 is sealed to the frame of the cartridge 2 by forcing over the edge 49 a metal plate 51 which has a flat outside edge 52 capable of engaging the edge 49.

A central region 53 of the plate 51 is dished concentrically with the edge 52 and forms a vertical recess 54 (see FIG. 6) in which one end 55 (see FIGS. 1 and 2) of the blade 6 is engaged. The blade 6 forms a blade-type spring, the length of which is slightly greater than that of the frame 13. Therefore, when the plate 51 is forced on to the edge 49, the blade 6 flexes and on the one hand ensures electrical contact with the plate 51 while on the other hand ensuring that the projections 36 on the block member 35 (see FIG. 3) bear against the alumina plate 3, without damaging the latter.

The plate 51 (see FIGS. 1 and 6) is provided with two symmetrical bent-over tongue portions 56 which are arranged to clasp the edge of the rim portion 43. The plate 51 is further provided at each of the four corners thereof with a toothed bevel or chamfer 57 (see FIG. 6) which is arranged to engage with the inside surface of the prismatic projections 44. In order to fix the plate 51 on the frame, the plate 51 is pressed against the rim portion 43, forcing the fourth toothed bevels 57 to penetrate into the inside surface of the projections 44.

Figure 2:
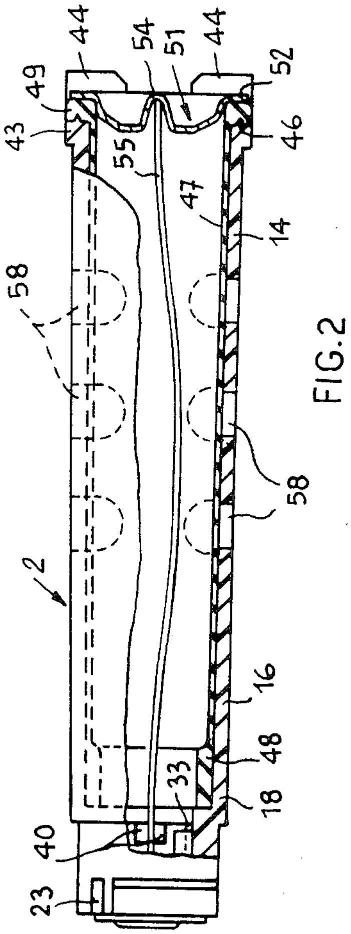
FIG. 2 is a partly sectional view along line II—II in FIG. 1.

A group of three openings 58 is provided in each of the two sides of the cylindrical body portion 14 (see FIGS. 1 and 2). The openings 58 of one group are symmetrical with respect to those of the other group. They are provided on the one hand to permit the membrane 47 to keep the ink always at a constant pressure, substantially equal to atmospheric pressure, while on the other hand being provided to meter the filling of the cartridge 2 with ink. The filling operation is performed using a tool formed by two jaws which are capable of locking on the frame of the cartridge 2. The jaws are provided with three pairs of projections of predetermined length which can be fitted into the openings 58.

After the block member 35 has been fitted into the ribs 33 on the frame and the blade spring 6 has been fitted between the ribs 40, the plate 3 is glued to the front portion 18 of the frame. The front edge 48 of the membrane 47 is then fitted into the cylindrical surface 32, with the rearward edge 49 being disposed on the rim portion 43. The cartridge 2 is now inserted between the two jaws which are closed whereby the frame is held in a fixed position and the projections on the jaws cause the membrane 47 to be deformed, thereby reducing the internal volume thereof by a predetermined amount.

The volume of the cartridge 2 which is thus defined by the deformation of the membrane 47 is now filled with ink and the plate 51 is forced on to the frame, for example by means of a punch. The toothed portions 57 are then wedged against the inside surfaces of the projections 44 of the frame whereby the cartridge 2 remains sealed. The membrane 47 is shown in FIGS. 1 and 2 with straight walls but in actual fact the membrane assumes a configuration which is dependent on the state of filling thereof and the internal pressure.

When the jaws of the tool are re-opened, the elasticity of the membrane 47 holds the ink in a state of slight depression in order to facilitate the formation of a concave meniscus at the outside edge of the nozzle 4 during the printing operation, as described in above-mentioned patent application No. EP0147186. Finally the spring member 26 (see FIG. 3) is fitted into the aperture 25 in the projection 24 in such a way that the opening 28 therein is engaged over the toothed 29.

The cartridge 2 is arranged to be removably mounted on a carriage 61 (see FIG. 7) which is produced by a single moulding operation of plastics material, for example Delrin. The carriage 61 is movable transversely with an alternating motion with respect to a sheet of paper 62 on a platen roller 63. The platen roller 63 in turn is rotated to move the paper 61 in a vertical direction to permit the printing of dots in successive elementary rows, for example for dot matrix alphanumeric printing.

The carriage 61 is guided transversely on a cylindrical guide 64 by means of a V-shaped mounting 66 and on another cylindrical guide 67 by means of a flat mounting 68. Two projections 69 (see FIG. 8) which are disposed below the mounting 66 are held in contact against the guide 64 by a blade-type spring 70 (see FIGS. 7 and 8) engaged on a projection 71 of the carriage 61 and so calibrated as to brake the travel movement of the carriage 61.

The carriage 61 comprises two longitudinal walls 72 between which the cartridge 2 is received. The two walls 72 are connected at the front by a transverse portion 73 in which a reference hole 74 is disposed. Engaged into the hole 74 is a conical projection 75 which is disposed above the front portion 18 of the cartridge 2. In particular the projection 75 is disposed on a projection 76 which is strengthened at the rear by a longitudinal rib 77 on the cartridge 2.

The carriage 61 is provided at its front with two parallel ribs 79 (see FIG. 8) which are arranged to engage the projection 24 of the front portion 18. In particular, the two inside wall surfaces of the ribs 79 are flared upwardly so as precisely to centre the projection 24.

In its lower part, the carriage 61 is provided with two openings 81 and 82 (see FIG. 7) into which is fitted an electrical contact blade member 83 which is in turn connected to the control circuit 8. The blademember 83 is provided with a triangular projection 84 which is bent upwardly to be engaged with the blade spring 26 of the cartridge 2. At its rear, the carriage 61 is provided with a mounting seat 86 in which a tongue portion 87 of the cartridge 2 is precisely positioned, both in a vertical and in a transverse position. Finally the carriage 61 is provided with an opening 88 in which a lever 89 of electrically conductive material is housed. The lever 89 is electrically connected to the control circuit 8 and is mounted pivotally on a fixed pin 91. It has an inclined edge 92 which is arranged to engage, due to the force of a spring 93, the lower edge 52 of the plate 51 of the cartridge 2.

In order for the cartridge 2 to be removed from the carriage 61, it is only necessary to withdraw the cartridge 2 from the mounting seat. For that purpose, the two upper projections 44 (see FIG. 6) of the cartridge are knurled. The edge 52 of the cartridge 2, acting on the inclined edge of the lever 89, causes the lever 89 to rotate, thereby overcoming the force of the spring 93. Alternatively, in order to withdraw the cartridge 2, the lever 89 may be rotated by hand. In order to insert a fresh cartridge, with the lever 89 (see FIGS. 7 and 8) having been thus rotated, the conical projection 75 of the cartridge 2 is first fitted into the hole 74. The cartridge 2 is then urged downwardly until the projection 24 engages between the ribs 79 and the tongue portion 87 is inserted into the mounting seat 86. The lever 89 is then released whereby the spring 93 causes the edge 92 to come into engagement with the edge 52 of the plate 51. The edge 92 on the one hand urges the cartridge 2 forwardly, forcing the projection 75 into the hole 74, while on the other hand the edge 92 urges the cartridge 2 downwardly, forcing the tongue portion 87 into the mounting seat 86, whereby the cartridge 2 remains precisely positioned on the carriage 61.

Figure 9:
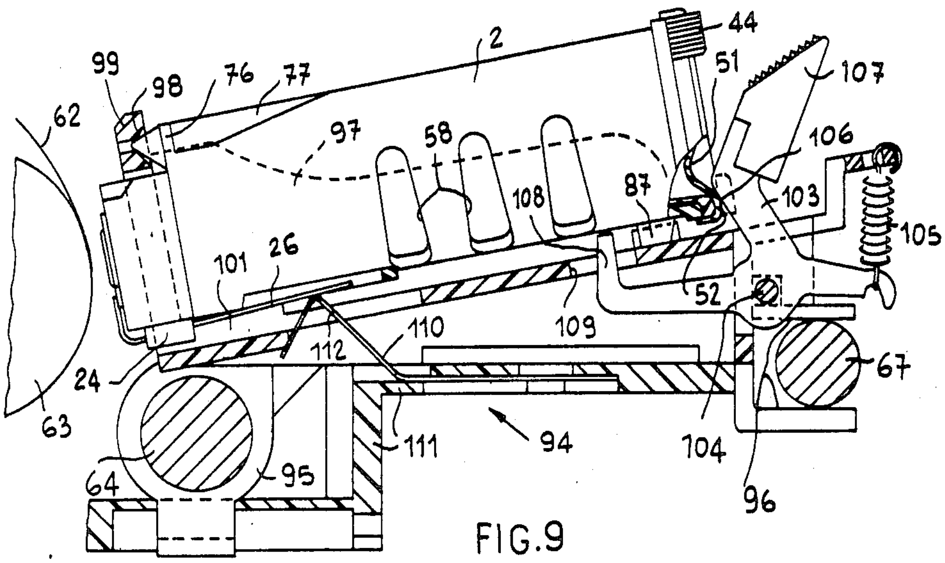
FIG. 9 is a partly sectional plan view of another embodiment of a printer incorporating a plurality of print heads according to the invention.
Figure 10:
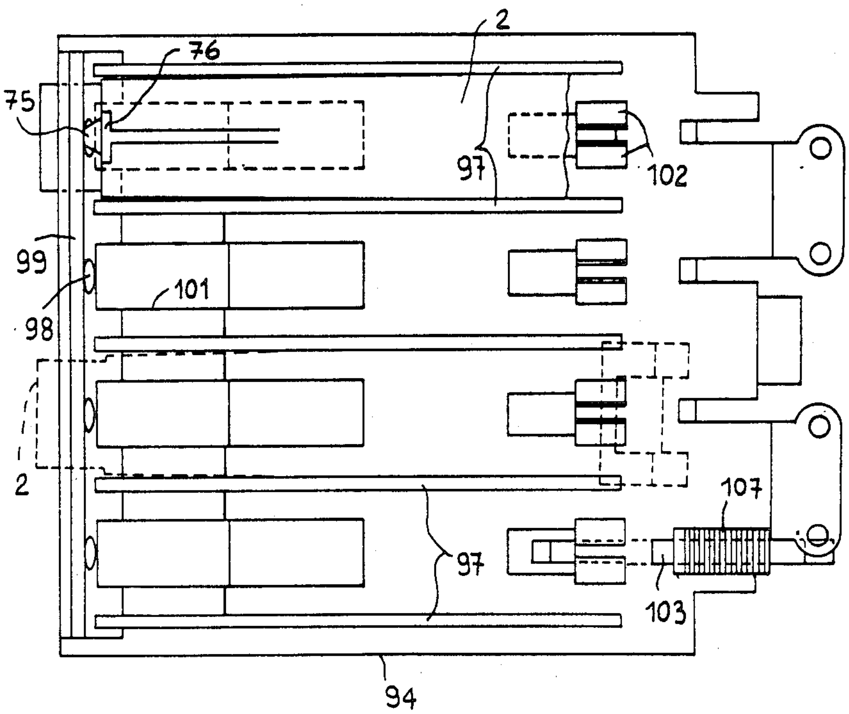
FIG. 10 is a plan view of the printer shown in FIG. 9.

In accordance with another embodiment of the printer, the carriage 94 (see FIGS. 9 and 10) is arranged to house a plurality of cartridges 2, for example four cartridges 2, for multi-colour printing. In that situation, three cartridges 2 are filled with ink of the three primary colours cyan, magenta and yellow, and the fourth cartridge 2 is filled with black ink. The cartridges 2 are disposed at a mutual spacing of 12.7 mm.

The carriage 94 is slidable on the bar 64 by means of two rings or bushes 95 and on the bar 67 by means of a flat mounting 96. Each cartridge 2 is housed between two longitudinal walls 97 and is engaged with the projection 75 into a corresponding hole 98 in a transverse portion 99. The projection 24 is fitted into a corresponding mounting seat 101 on the carriage 94 while the tongue portion 87 is fitted between two parallel projections 102 on the carriage 94.

Finally, each cartridge 2 is held in position by a corresponding lever 103 which is pivotally mounted on a pivot wire 104 and urged in an anti-clockwise direction by a spring 105. The lever 103 is provided with an inclined edge 106 similar to the edge 92 on the lever 89 (see FIG. 7). The lever 103 has a projection 107 (see FIG. 9) of knurled plastics material to make it easier to grip it and a projection 108 which is arranged to engage the cartridge 2 through a corresponding aperture 109 in the carriage 94. Finally the carriage 94 is provided with four contact blades 110 connected to the control circuit and fixed to the carriage 94 by means of a fixing plate 111 which is fixed to the carriage 94. Each spring member 110 has a projection 112 which can engage the spring blade 26 of the corresponding cartridge 2.

Figure 7:
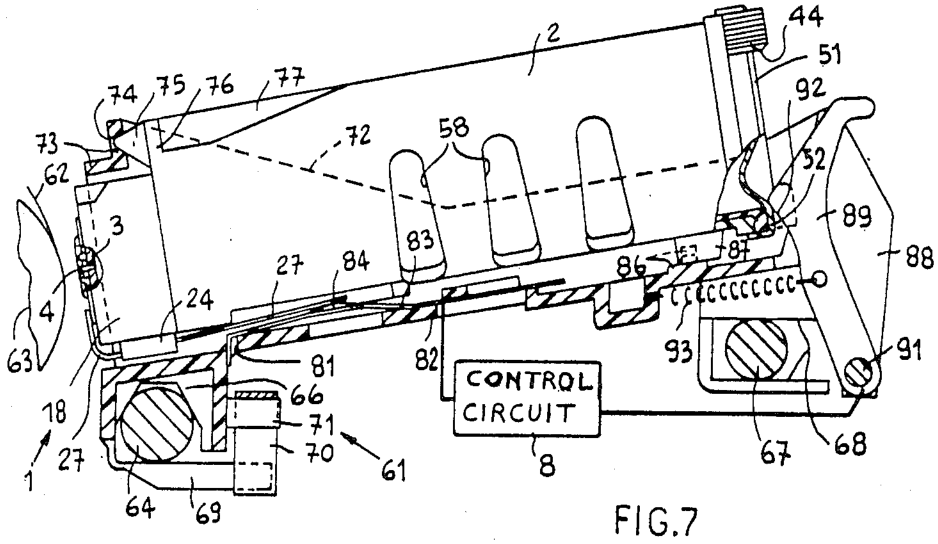
FIG. 7 is a partly sectional side view of a first embodiment of a printer incorporating the print head according to the invention.
Figure 8:
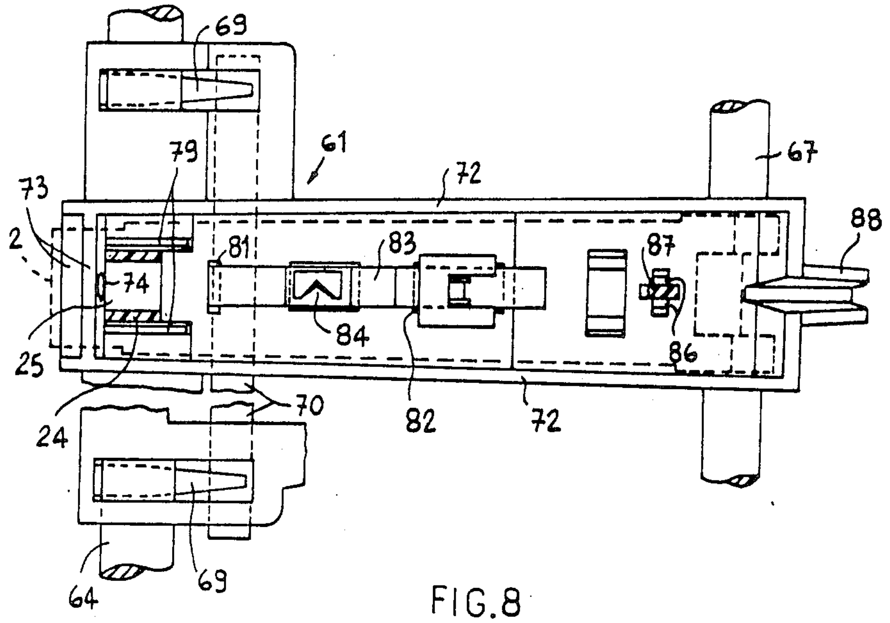
FIG. 8 is a plan view of the printer shown in FIG. 7.

The cartridges are fitted into and removed from the respective mounting seats by individually operating the lever 103 in a similar manner to that described above in relation to the lever 89 on the carriage 61 in FIGS. 7 and 8. When a lever 103 is rotated in a clockwise direction, the projection 108 then acts on the cartridge 2, withdrawing it from its mounting seat and urging it upwardly, thereby facilitating extraction of the individual cartridge 2.

It will be appreciated that the above-described print head and printers may be the subject of various modifications and improvements without thereby departing from the scope of the invention. For example the plate 51 (see FIG. 6) can be fixed to the rim portion 43, by replacing the toothed portions 57 by holes receiving corresponding pins integrally provided on the rim portion 43, and then hot welding the pins. The alumina plate 3 (see FIG. 5) may have a different kind of metallisation and a different anti-wear covering. It may also be welded to fhe portion 18 by predisposing the adhesive in the groove 21 instead of injecting it through the duct 23. Finally the blade members 83 and 110 on the carriages 61 and 94 may be of different forms and may be connected to the carriage in other ways. The blades 83 and 110 and/or the levers 89 and 103 may be connected to the control circuit 8 by way of the guide bars 64 and 67 respectively or by way of flat cables.

We claim:

1. An ink jet print head for electrically conductive ink comprising a container (2) for the ink, having a nozzle (4) for the on-demand emission of droplets of ink, an electrode (6) in contact with the ink and a counter-electrode (7) adjacent to the nozzle. The emission being caused by an electrical voltage pulse between the counter-electrode and the electrode such as to cause vaporisation of the ink in a portion of the nozzle, characterised in that the container (2) comprises a rigid frame (14, 16) of insulating material of tapered shape, the nozzle (4) being disposed at one end thereof, a tubular membrane (47) fitted into the frame to contain the ink and having an edge (48) connected sealingly to the frame in the vicinity of said nozzle, and a second edge (49) connected to the opposite end of the frame and locked thereto by a metal plate (51) connected to the electrode (6), the frame being provided on two opposite side surfaces with at least two corresponding openings (58) to permit the membrane to keep the ink at atmospheric pressure during the printing operation.

2. A head according to claim 1, characterised in that the frame comprises a front portion (18) forming a chamber (30) for collecting the ink in the vicinity of the nozzle (4) which is carried by an alumina plate (3) fixed to the front portion and provided with at least one metal layer forming the counter-electrode (7), the said electrode (6) being formed by a blade spring having a first portion in a flexural condition in contact with the metal plate (51) and a second portion (42) housed in the collecting chamber (30).

3. A head according to claim 2, characterised in that the frame comprises a cylindrical body portion (14) which is of vertically elongated section and is closed by the metal plate (51), and a conical body portion (16) disposed between the cylindrical body portion and the front portion (18), the first edge (48) of the cylindrical membrane (47) being a close fit against the inside surface (32) of the end of the conical body portion (16).

4. A head according to claim 3, characterised in that the front portion (18) comprises a first rectangular rim portion (19) to which the alumina plate (3) is fixed, and the cylindrical body portion comprises a second rectangular rim portion (43) to which the metal plate (51) is fixed, the rim portions being of a width substantially equal to that of the section of the cylindrical body portion (14).

5. A head according to claim 4, characterised in that said first rim portion (19) comprises a peripheral groove (21) which is accessible from the outside surface of the frame by way of a connecting groove (23), the peripheral groove being closed frontally by the alumina plate (3), which is fixed to the first rim portion by adhesive injected into the peripheral groove through the connecting groove.

6. A head according to claim 4, characterised in that the blade spring (6) is flexed between the metal plate (51) and a block member (35) which is fitted in the front portion (18), the block member being provided with projections (36) for bearing against the alumina plate (3) and a reaction surface (37) in opposition to the emission of the ink, which is disposed at a position corresponding to the nozzle and parallel to the alumina plate, the projections (36) being of a dimension such as to hold the reaction surface at a spacing from the alumina plate which is substantially equal to the thickness of the alumina plate and to permit access for the ink by capillary action from the chamber (30) to the nozzle (4).

7. A head according to claim 6, characterised in that the second rim portion (43) is provided at each corner with an axial projection (44), the metal plate (51) being provided at each corner with a toothed bevel portion (57) associated with the corresponding projection and capable of being forced against the inside surface of the projection to seal the plate against the tubular membrane (47).

8. A head according to claim 1, characterised in that the membrane (47) is filled with ink before fixing of the metal plate (51), after firstly reducing the volume of the membrane by means of a tool which passes through the said openings (58), in such a way that, after the metal plate has been fixed, the pressure of the ink is slightly below atmospheric pressure by virtue of the elasticity of the membrane.

9. A printer for use with a print head for electrically conductive ink comprising a container (2) for the ink, having a nozzle (4) for the on-demand emission of droplets of ink, an electrode (6) in contact with the ink and a counter-electrode (7) adjacent to the nozzle, the emission being caused by an electrical voltage pulse between the counter-electrode and the electrode such as to cause vaporisation of the ink in a portion of the nozzle, wherein the container (2) comprises a rigid frame (14, 16) of insulating material of tapered shape, the nozzle (4) being disposed at one end thereof, a tubular membrane (47) fitted into the frame to contain the ink and having an edge (48) connected sealingly to the frame in the vicinity of said nozzle, and a second edge (49) connected to the opposite end of the frame and locked thereto by a metal plate (51) connected to the electrode (6), the frame being provided on two opposite side surfaces with at least two corresponding openings (58) to permit the membrane to keep the ink at atmospheric pressure during the printing operation, said printer comprising a transversely movable carriage (61; 94) having a mounting seat for removably accommodating the head, characterised in that the head is locked in the mounting seat by means of a metal member (89; 103) carried by the carriage and urged resiliently against the metal plate (51), the metal member being electrically connected to a control circuit (8).

10. A printer according to claim 9 characterised in that said mounting seat comprises elements (86) having a vertical securing action and lateral guide elements (72, 79) for said head and a reference hole (73) for a conical projection (74) disposed on the front portion of the head, the metal member being formed by a lever (89) of such a form as to urge the conical projection into the reference hole and the head against the securing elements.

11. A printer according to claim 10, characterised by a blade spring (83) fixed to the carriage (61) and provided with a resilient tongue portion (84) arranged to be engaged by a blade member (26) carried by the head.

12. A printer according to claim 10, comprising a plurality of mounting seats for accommodating a plurality of heads, characterused in that each head is held in its mounting seat by a corresponding lever (103) in that the latter comprises a projection (108) arranged positively to expel the corresponding head from the mounting seat thereof when the lever releases the head.

13. A printer according to claim 12, characterised in that, disposed in each mounting seat is a contact blade spring (110) having a resilient projection in engagement witha blade member (26) carried by said head, the blade springs being fixed to the carriage by means of a plate (111).

* * * * *